US010428554B2

(12) United States Patent
Johns et al.

(10) Patent No.: US 10,428,554 B2
(45) Date of Patent: Oct. 1, 2019

(54) POST MOUNTING SYSTEM AND APPARATUS

(71) Applicant: ONESTEEL WIRE PTY LIMITED, Sydney, New South Wales (AU)

(72) Inventors: Graham Johns, Hamilton (NZ); Robert Wade, Hamilton (NZ); Robert Fabien, New South Wales (AU); Lawrence O'Toole, New South Wales (AU)

(73) Assignee: ONESTEEL WIRE PTY LIMITED, Sydney, New South Wales (AU)

( * ) Notice: Subject to any disclaimer, the term of this patent is extended or adjusted under 35 U.S.C. 154(b) by 0 days.

(21) Appl. No.: 14/773,483

(22) PCT Filed: Feb. 24, 2014

(86) PCT No.: PCT/AU2014/000168
§ 371 (c)(1),
(2) Date: Sep. 8, 2015

(87) PCT Pub. No.: WO2014/134660
PCT Pub. Date: Sep. 12, 2014

(65) Prior Publication Data
US 2016/0025241 A1 Jan. 28, 2016

(30) Foreign Application Priority Data

Mar. 7, 2013 (AU) .................. 2013900790
Apr. 12, 2013 (AU) .................. 2013204291

(51) Int. Cl.
*E04H 17/10* (2006.01)
*A01K 3/00* (2006.01)
(Continued)

(52) U.S. Cl.
CPC ............. *E04H 17/24* (2013.01); *A01K 3/005* (2013.01); *E04H 17/10* (2013.01); *A01G 17/06* (2013.01);
(Continued)

(58) Field of Classification Search
CPC ........ A01K 3/005; E04H 17/10; E04H 17/12; E04H 17/24; H01B 17/145
(Continued)

(56) References Cited

U.S. PATENT DOCUMENTS 977,386 A * 11/1910 Hall ........................ E04H 17/10
24/265 A
1,925,488 A * 9/1933 Kern ....................... E04H 17/10
24/115 A
(Continued)

FOREIGN PATENT DOCUMENTS

| AU | 2013204419 | | 1/2014 | | |
|---|---|---|---|---|---|
| GB | 2286839 A | * | 8/1995 | ............. | A61K 3/005 |

(Continued)

OTHER PUBLICATIONS

PCT/AU2014/000168 International Search Report and Written Opinion dated Apr. 22, 2014 (17 pages).
(Continued)

*Primary Examiner* — Jonathan Liu
*Assistant Examiner* — Guang H Guan
(74) *Attorney, Agent, or Firm* — Michael Best & Friedrich LLP

(57) ABSTRACT

An apparatus (10, 100) is disclosed for connection to a flange (52, 152) of a post. The flange comprises elongated apertures/holes (54, 154) therethrough. The apparatus comprises a body (12 or 112) having projections (14, 16 or 114, 116) that extend from the body to a distal end. A lug (18, 118) projecting laterally from a distal end of each projection (Continued)

has a profile configured such that it is able to nest in the elongated aperture of the flange when the apparatus is connected to the flange. The apparatus also comprises two locator elements (30, 32 or 130,132) that extend out from the body separately to the projections. The elements are spaced so as to receive the post flange therebetween, whereby the elements locate on opposite sides of the flange when the apparatus is connected to the flange.

13 Claims, 12 Drawing Sheets

(51) Int. Cl.
    *E04H 17/24*     (2006.01)
    *A01G 17/06*     (2006.01)
    *H01B 17/14*     (2006.01)
    *E04H 17/14*     (2006.01)

(52) U.S. Cl.
    CPC .... *E04H 2017/1447* (2013.01); *H01B 17/145* (2013.01); *Y02A 40/294* (2018.01)

(58) Field of Classification Search
    USPC ........ 174/158 F, 158 R, 161 F, 161 R, 163 F, 174/163 R, 164, 166 R, 169, 173; 256/10, 47, 48, 54; 248/218.4, 65
    See application file for complete search history.

(56) References Cited

U.S. PATENT DOCUMENTS

| | | | | |
|---|---|---|---|---|
| 2,386,129 | A * | 10/1945 | Maack | E04H 17/12 174/158 F |
| 2,438,419 | A * | 3/1948 | Schmidt | H01B 17/145 174/154 |
| 3,820,758 | A * | 6/1974 | Berg, Jr. et al. | A01K 3/005 174/163 F |
| 3,858,996 | A * | 1/1975 | Jarvis | A47B 57/50 403/353 |
| D347,823 | S * | 6/1994 | Berg | E04H 17/10 D13/132 |
| 6,583,363 | B1 * | 6/2003 | Wilson, Jr. | H01B 17/145 174/158 F |
| 6,824,122 | B2 * | 11/2004 | Spyrakis | E04H 17/161 256/1 |
| 6,872,892 | B1 * | 3/2005 | Burdick | H01B 17/145 174/158 F |
| 7,207,542 | B2 * | 4/2007 | Conway | G09F 7/18 248/220.21 |
| 7,511,227 | B2 * | 3/2009 | Ritchie | H02G 3/263 174/158 F |
| 7,637,481 | B2 * | 12/2009 | Forero | E04H 17/12 256/54 |
| 7,968,797 | B2 * | 6/2011 | Williams | H01B 17/22 174/138 G |
| 9,551,457 | B2 * | 1/2017 | Johns | A01K 3/00 |
| 2011/0233497 | A1 * | 9/2011 | Forge | E04H 17/10 256/47 |
| 2015/0225978 | A1 * | 8/2015 | White | E04H 17/10 256/46 |
| 2016/0025241 | A1 * | 1/2016 | Johns | E04H 17/10 248/65 |

FOREIGN PATENT DOCUMENTS

| | | |
|---|---|---|
| WO | 2005/075764 A1 | 8/2005 |
| WO | 2013/040654 | 3/2013 |
| WO | 20131086565 | 6/2013 |

OTHER PUBLICATIONS

PCT/AU2014/000168 International Preliminary Report on Patentability dated Mar. 2, 2015 (10 pages).
PCT/AU2014/000168 International Written Opinion dated Jan. 19, 2015 (11 pages).
PCT/AU2014/000168 International Written Opinion dated Feb. 6, 2015 (9 pages).

* cited by examiner

POST MOUNTING SYSTEM AND APPARATUS

TECHNICAL FIELD

A post mounting system and apparatus are disclosed which enable items to be secured to a post, for example, a strand. The system and apparatus can be employed in applications such as fencing, electric fencing, demarcation, signage, retention, barricades, etc. The post can include one or more apertures or holes through e.g. a flange of the post to enable attachment of the apparatus thereto. Each aperture or hole may be elongated, although is not so limited. The apparatus when attached to the post can enable various items to be secured at the post (e.g. such as fence wire, electric fence wire, signage, panels, etc). The post can take the form of a picket (e.g. that comprises a "stalk" flange and one or more other elongate flanges projecting from the stalk). However, the system and apparatus are to be broadly interpreted, in that the post can form a rail, a cross-member, a strut, a stay, a channel, etc in use.

BACKGROUND ART

Posts used in applications such as fencing, demarcation, signage etc are usually formed from steel, though in some applications (e.g. electric fencing) it is known to mould such posts from a plastic material.

Steel fence posts have been known for many years that are roll-formed to have a Y-shaped or T-shaped profile (i.e. in end view). The post may take the form of a picket and in this case may he provided (e.g. cut) with a pointed end to facilitate post driving into the earth.

Such fence posts are usually provided with a series of spaced holes in a flange thereof (i.e. in the so-called "stalk", "stem" or "base web") to enable strands of fencing wire to be secured to the post, usually by tying each wire strand to the post with a separate short length of wire tie, or by employing a wire "clip". However, the wire can also be threaded directly through such holes. These holes are typically punched into an already roll-formed post in a separate step. The terms "flange" and "stalk" may be used interchangeably. For example, a post (such as a Y-post or T-post) with multiple flanges may often have a single flange that is larger than the other flanges, and this may be referred to as a "stalk" or "stem".

In addition to (or as an alternative to) the series of holes, the posts can be provided with a series of spaced passages that are usually machined to project right into the stalk from a distal edge thereof. These passages enable a strand of fencing wire to be moved into and retained in the passage, thereby securing the wire directly to the post. Again, these passages are typically machined into an already roll-formed post in a separate step.

It is known that such holes and passages in the stalk decrease the bend strength of a post, and can promote points/regions of post failure as well as points/regions for corrosion of fencing wire (e.g. when the wire is threaded through the holes or located in the passages). The holes and passages can also provide sharp catch points.

In addition, the existing systems for attaching wire to a fence post present a high degree of manual labour, and some of the ties employed also require the services of a skilled fencer.

WO 2011/020165 to the present co-applicant discloses a post mounting system and device in which the device is designed to secure to the post immediately upon assuming its desired location therealong.

Some posts have holes punched in the stalk which are elongate rather than round and which increase the strength of the stalk but allow a smaller cross sectional aperture for a post mounting system to fix to. Also, known fixing methods for fixing to a round hole in the stalk of a post can result in a loose fitting attachment because, for example, a round pin can easily rotate in the round hole.

The above references to the background art do not constitute an admission that the art forms a part of the common general knowledge of a person of ordinary skill in the art. The above references are also not intended to limit the application of the apparatus and system as disclosed herein.

SUMMARY OF THE DISCLOSURE

Disclosed is an apparatus for connection to a post. The apparatus can be suitable for attachment to a T-post or Y-post, where one of the flanges of the post (e.g. a stalk thereof) comprises one or more elongated apertures therethrough. When multiple elongated apertures are present in the flange of the post they may be spaced out along the length thereof. The elongated apertures may also, for example, have a slot-like form.

In one form the apparatus comprises a body having at least one projection that extends from the body to a distal end. The body may take the form of a plate (and it may e.g. be moulded from plastic).

The apparatus also comprises a lug projecting laterally from a distal end of the at least one projection. The lug has a profile configured such that it is able to nest in the elongated aperture of the flange when the apparatus is connected to the flange. This nesting of the lug can facilitate a more secure mounting of the projection in the elongated aperture (e.g. it can allow for optimal use of the elongated aperture to enhance mounting of the apparatus to the post). The nesting may also serve to prevent rotation of the lug in the aperture.

For example, the cross-sectional profile of the lug may be configured such that it is able to nest in a snug manner in the elongated aperture of the flange when the apparatus is connected to the flange. In one example, each of flange apertures and lug profiles may comprise a round-cornered rectangular profile that are generally sized and shaped so as to match each other.

In one embodiment, the flange comprises two or more (e.g. multiple) elongated apertures that are spaced out along the length of the flange. In one embodiment, the body may comprise two or more corresponding projections that each extend from the body to a respective distal end. A respective lug may laterally project from the distal end of each such projection, and the lugs may laterally project in e.g. opposite directions to each other. As set forth above, each such lug may he profiled such that, when the apparatus is connected to the flange, each lug is able to nest (e.g. snugly) in a respective elongated aperture.

In one embodiment, the apparatus may further comprise two locator elements. Each element may extend out from the body, and each may be spaced so as to receive the flange of the post therebetween. In this way, the elements can locate on opposite sides of the flange when the apparatus is connected to the flange. The locator elements can function to restrict or prevent lateral (i.e. side-to-side) movement of the apparatus when it is connected to the post.

The locator elements may also co-operate with the at least one projection to enhance securement of the apparatus to the flange of the post. In this regard, the locator elements may prevent side-to-side and rotational movement of the apparatus when it is connected to the post, and the lugs of the one or more projections can prevent the apparatus from sliding up, down or away from the post.

In one variation of this embodiment, the two locator elements may be arranged to extend out from the body such that the elements face each other in an opposed relationship, such that the two locator elements may locate on directly opposing regions of the post flange when the apparatus is connected thereto.

In this variation the first and second projections and the two locator elements may all project from a common face of the body. Further, the arrangement may be such that, when the apparatus is connected to the flange in use, the first projection may be located above the two locator elements and the second projection may be located below the two locator elements.

In another variation of this embodiment, the two locator elements may be arranged to extend out from the body such that the locator elements are vertically offset from each other but such that each projects towards a respective side of the flange when the apparatus is connected thereto. For example, a distal end of each element may engage with its respective side of the flange when the apparatus is connected thereto.

In this other variation, the first and second projections and the two locator elements may all project from a common face of the body. However, when the apparatus is connected to the flange in use, one of the locator elements may face the first projection and may define a space for the flange to locate therebetween. Further, the other of the locator elements may face the second projection and may define a space for the flange to locate therebetween. In use, the first projection may generally be located above the second projection (e.g. to be above but offset therefrom).

Also in this other variation, the distal end of each locator element may be arranged to face its respective projection but at a location that is inset towards the body and with respect to the lug. This inset configuration means that the locator element distal end does not align with the flange elongate aperture when the apparatus is connected to the flange (i.e. it instead rests against the flange).

Further, in this other variation each locator element may have a flexible characteristic. For example, each locator element may take the form of a leaf spring so that, where the apparatus is e.g. rotatably mounted to the post, each locator element is able to be deflected (e.g. inwardly towards the base) by a distal edge of the flange and, once mounted, to return to its original position to locate against a respective side of the flange.

In one embodiment, the lugs of the first and second projections may extend in opposite directions. In this regard, the lug of the first projection may be configured to nest into its elongate aperture at one side of the flange, and the lug of the second projection may be configured to nest into its elongate aperture at an opposite side of the flange. This opposing configuration can again further enhance securement of the apparatus to the flange of the post.

In one embodiment, a distal end of each lug may comprise a lip. The lug may be configured such that, when the apparatus is connected to the flange, the lug extends through the elongated aperture and the lip may thereby locate behind a surface of the flange to further secure the apparatus thereto. The lip may comprise an elongate ridge formed to extend along an edge, and so as to project from a side face, of the lug so as to face back towards the body. This ridge may deform whilst and until the lug distal end has passed through the elongated aperture. The lip can thereby act as a catch for the lug, to again enhance securement of the apparatus to the post flange.

Different parts of the apparatus may be moulded of plastic to have a flexible characteristic so as to allow those parts to be deflected as the apparatus is being connected to the flange, and to deflect back once the lug has aligned with its elongate aperture.

For example, in one embodiment, each projection may comprise a plastic moulding having a flexible characteristic so as to allow the projection to be deflected outwardly as the apparatus is being connected to the flange, and to deflect back inwardly once the lug has aligned with its elongate aperture. In this regard, the apparatus can be push-fit onto the post and can be connected thereto in a type of snap-lock.

In another embodiment, each projection may comprise a plastic moulding having a relatively rigid characteristic. In this regard, the apparatus can be manipulated onto the post and the locator elements may then be configured to have a flexible characteristic so as to connect the apparatus to the flange in a type of snap-lock.

Also disclosed herein is apparatus for connection to a flange of a post (e.g. such as a stalk of a T-post or Y-post). The flange comprises one or more holes therethrough.

The apparatus comprises a body. The body may be as defined above.

The apparatus also comprises at least one projection extending from the body to a distal end. A lug projects laterally from the projection. The lug has a profile configured such that it is able to locate (e.g. closely or snugly) in a hole of the flange when the apparatus is connected to the flange.

The apparatus further comprises two locator elements. Each element extends out from the body separately to the at least one projection. The elements are spaced so as to receive the flange of the post therebetween. The elements thus locate on opposite sides of the flange when the apparatus is connected to the flange.

As set forth above, the two locator elements can co-operate with the at least one projection to enhance securement of the apparatus to the flange of the post, and can function to restrict or prevent lateral (i.e. side-to-side) movement of the apparatus when it is connected to the post. The elements may also function to guide the mounting of apparatus onto the flange of the post. The two locator elements may otherwise be as defined above.

In one embodiment the flange holes may each take the form of an elongated aperture, as set forth above.

In one embodiment, the apparatus may be formed from injection moulding of a plastic material. For example, the plastic material may comprise a high density polyethylene, or other suitable high-strength plastic.

In one embodiment, a side of the body that opposes the projections may be provided with an attachment mechanism, such as a pin lock or W-connector for mounting an electric fence wire or another item to the post.

In another embodiment, the side of the body that opposes the projections may be provided with a sign or reflector, which may e.g. be integrally moulded with the body. Alternatively, the sign or reflector can be adapted for independently mounting to the attachment mechanism (e.g. to the pin lock or W-connector).

One mode of mounting to a post flange the apparatus as set forth above relates to the case where the projections are relatively flexible, and the locator elements are relatively rigid. In this mode the projections can be positioned on either side of the flange, whereby the lugs sit adjacent to (e.g. abut) a respective side of the flange. The apparatus may then be rotated (e.g. twisted by a user), so that the projections bend/flex along their length (e.g. being deformed by the reactionary force exerted by the flange against each lug). Eventually, a distal edge of the flange can align with a recess defined between the locator elements. The apparatus can then be pushed inwardly of the post, whereby the lugs are urged (e.g. forced) across their respective sides of the flange whilst, at the same time, the stalk passes into the recess between the relatively rigid locator elements. This inwards pushing continues until the lugs align with their respective apertures/holes in the flange, whereby the projections now bend/flex back again, to return to their un-deformed positions, and thereby causing the lugs to pass through and into their respective apertures/holes. The apparatus is now securely mounted to the post.

Another mode of mounting to a post flange the apparatus as set forth above relates to the case where the projections and lugs are relatively rigid, and the locator elements are relatively flexible. In this mode the apparatus is oriented (e.g. pre-twisted by a user before mounting onto the flange) so that lugs can generally be aligned with a respective aperture/hole in the flange of the post. In this initial location a distal edge of the flange sits adjacent to (behind) each of the two locator elements. The apparatus is then rotated (e.g. twisted in an opposite way to pre-twisting) so that the relatively rigid lugs pass into and through their respective apertures/holes. At the same time, the distal edge of the flange passes against (e.g. acts against and slides across) each of the two locator elements, and causes them to deform (e.g. flex back) towards the base. This inwards deformation continues until the distal edge of the flange has moved past a distal edge of each of the locator elements. At this point, each of the locator elements flexes (e.g. springs) back to return to its original (e.g. outwardly biased) position, with each locator element now locating at (e.g. abutting) a respective side of the flange. This location (abutting) prevents the apparatus from rotating or being displaced in such a direction as to disengage each lug its respective aperture/hole, whereby the apparatus has again become securely mounted to the post.

Also disclosed herein is a post mounting system. The system comprises a post having at least one elongate flange. The flange comprises one or more holes or apertures therethrough. When multiple holes or apertures are present they may be spaced out along the length of the flange.

The system also comprises apparatus for securing with respect to the one or more holes or apertures of the flange of the post (e.g. to an adjacent two holes or apertures). The apparatus can be as defined above. In this regard, at least one of the distal ends of at least one the projections of the apparatus may comprise a lug that has a profile configured in a similar manner to that of the flange hole or aperture.

In one embodiment, the system may comprise at least two such apparatus, each for securing with respect to respective holes or apertures of the flange. For example, the post flange may comprise at least two adjacent holes or apertures for such apparatus.

BRIEF DESCRIPTION OF THE DRAWINGS

Notwithstanding that which has been described in the Summary, specific features of the system and apparatus will become apparent from the following description, which is given by way of example only, and with reference to the accompanying drawings in which.

DETAILED DESCRIPTION OF SPECIFIC EMBODIMENTS

Figure 1A:
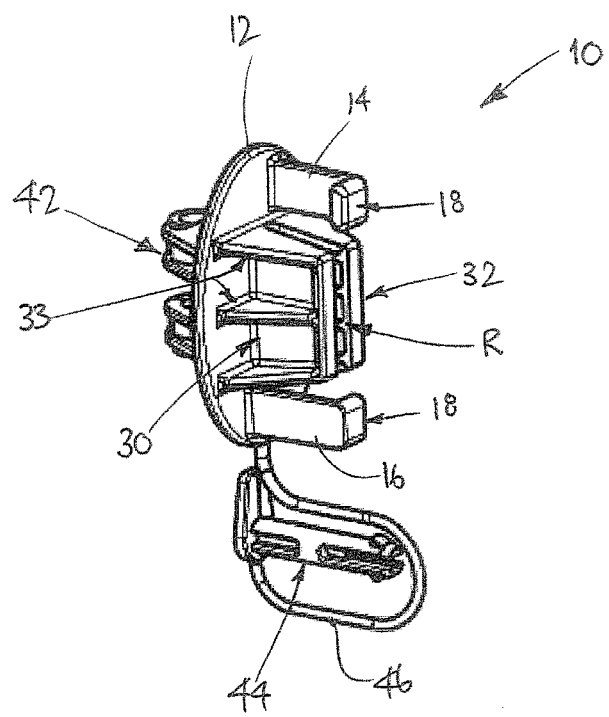
FIG. 1a shows a perspective view of a first embodiment of apparatus for a post mounting system, the apparatus being depicted in an unattached condition.
Figure 1B:
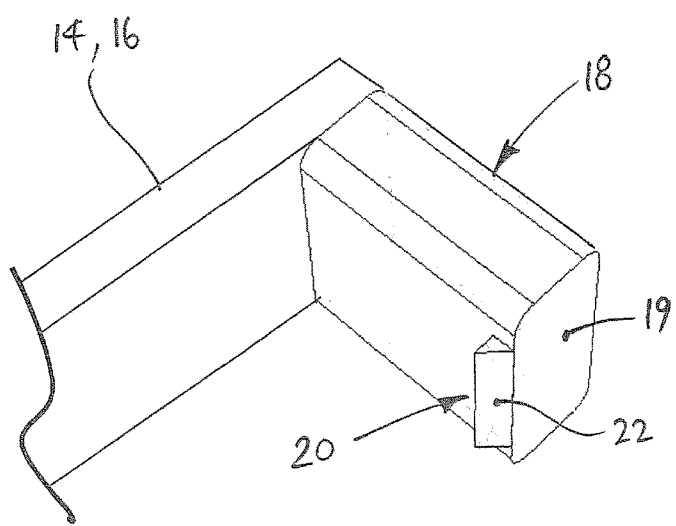
FIG. 1b shows a perspective detail of part of the apparatus embodiment of FIG. 1.
Figure 2:
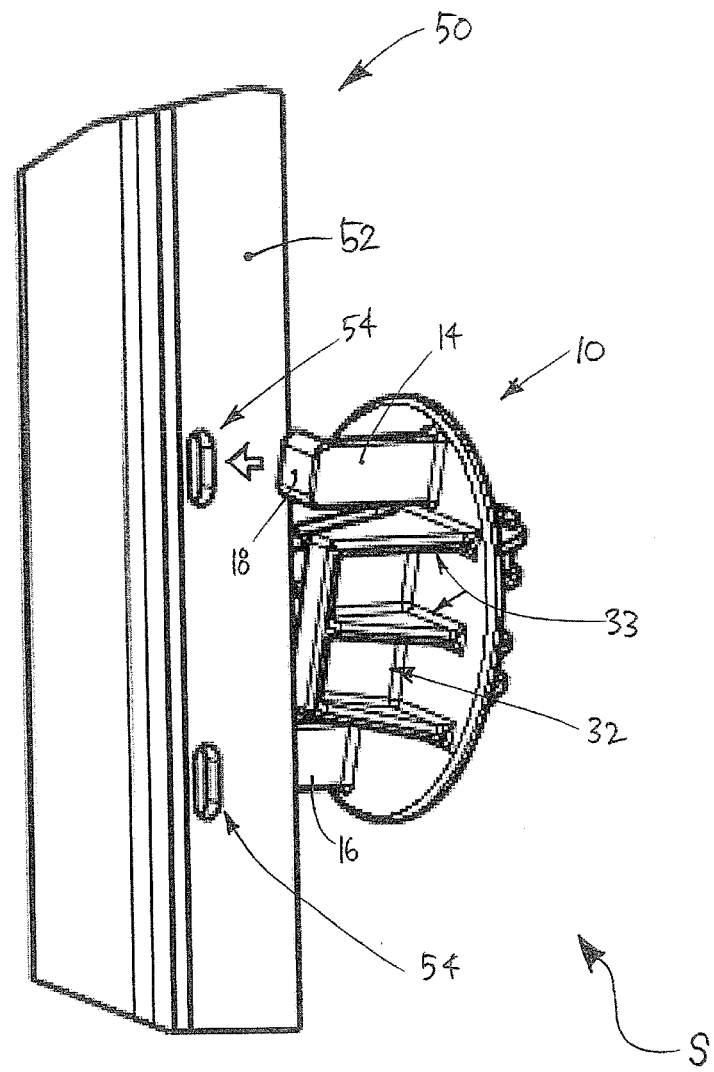
FIG. 2 shows a perspective view of the apparatus embodiment of FIG. 1, with the apparatus ready to be mounted to a stem of a Y- or T-post.
Figure 3:
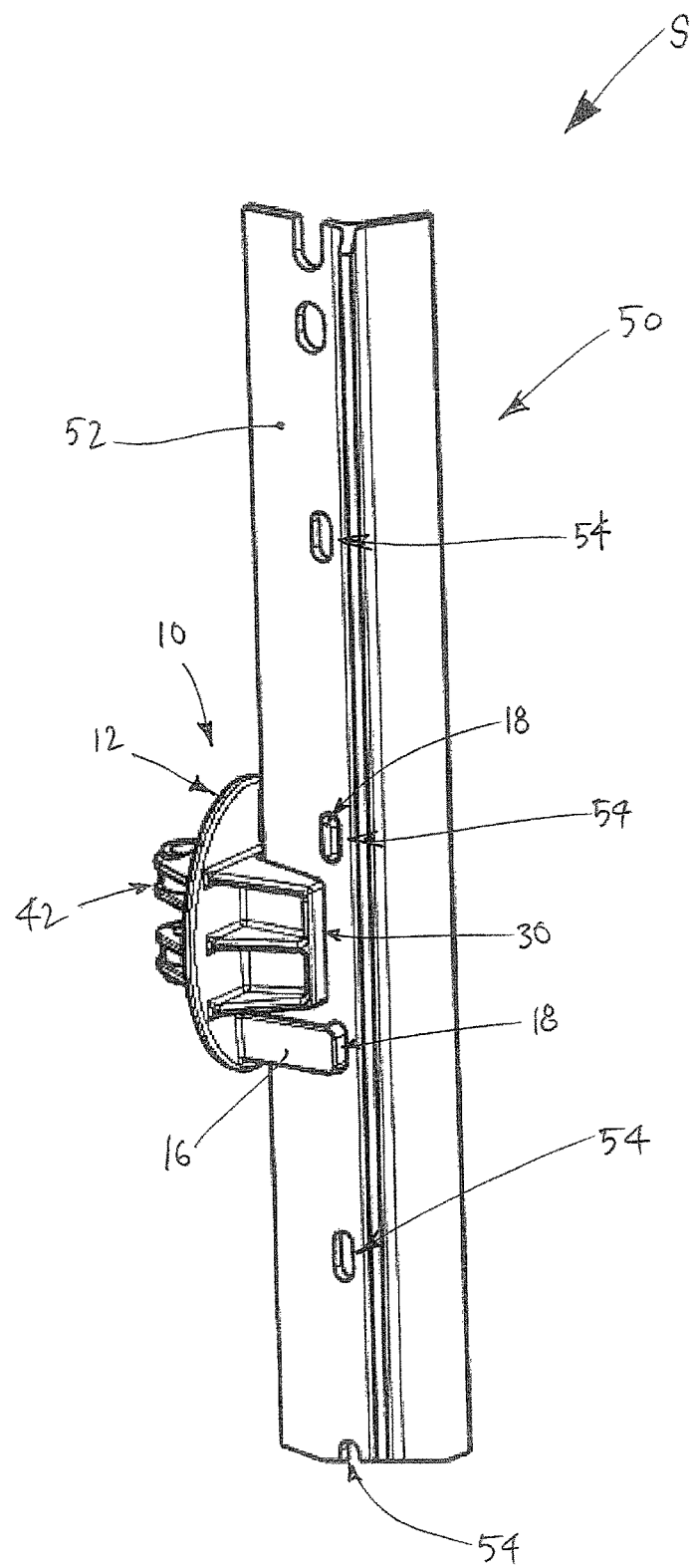
FIGS. 3 and 4 respectively show perspective and end views of the apparatus embodiment of FIG. 1, with the apparatus having been mounted to the stem of the Y- or T-post.
Figure 4:
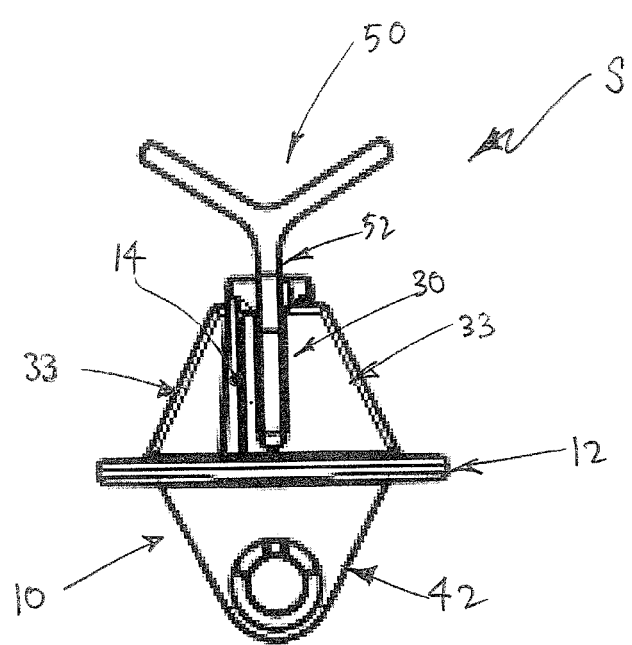

Referring to FIGS. 1a, 1b and 2 to 4, an apparatus for a post mounting system S is shown in the form of a connector 10. The connector 10 is particularly suited for attachment to a Y-post or T-post 50 (as shown in FIGS. 2 to 4), although it should be understood that the connector 10 can be adapted to other post formats. Also, as part of the system 5, a number of such connectors 10 can be attached or mounted along each such Y-post or T-post 50.

The connector 10 comprises a body in the form of an oval-shaped base plate 12. In the connector embodiment of FIGS. 1 to 4, two projections in the form of an upper finger 14 and a lower finger 16 are formed to extend laterally from a face of the base plate 12. However, in a simpler form of the connector, just a single upper finger or just a single lower finger can be provided to extend laterally from the base plate 12. A longer form connector may, for example, be provided that comprises three or more such fingers for e.g. mounting to three adjacent slots.

At a distal end of each finger 14 or 16 a laterally protruding lug in the form of a latch 18 is formed. In the connector embodiment shown in FIGS. 1 to 4 the latches of the upper finger 14 and lower finger 16 extend in opposite directions, for optimal securement of the connector to the post. However, the fingers 14 and 16 and latches 18 can be rearranged whereby the latches extend in the same direction.

In accordance with the present disclosure, each latch 18 has a cross-sectional profile that is configured such that it is able to nest in a given aperture formed in a major flange of the Y-post or T-post 50, in this case the so-called stalk (or stem) 52 of the post 50. For example, the cross-sectional profile of each latch 18 may be configured such that it is able to nest in a snug manner in the given aperture.

In the embodiment of FIGS. 1 to 4, each such aperture is elongate and takes the form of a rectangular slot 54 with rounded corners (e.g. to be "racecourse" shaped). Thus, the cross-sectional profile of each latch 18 can be similarly configured to e.g. match this form. In this regard, when so configured, the latch profile is able to make optimal use of the elongate shape of the slot 54. For example, the cross-sectional profile of each latch 18 can be dimensionally close to the slot 54, or it may have the same profile but of a lesser consistent dimension moving around the latch 18.

Each of the fingers 14 and 16 can be formed from a material with a flexible, spring characteristic, such as a plastic moulding, to allow each finger 14 and 16 to be deflected outwardly by the stalk 52 as the connector 10 is being connected thereto (see FIG. 2), but to deflect back inwardly once its latch 18 has aligned with a respective slot 54 (see FIG. 3). In this regard, the connector 10 can be push-fit onto the post and can be connected thereto in a type of snap-lock.

In the embodiment of FIGS. 1 to 4, a number of elongate slots 54 are spaced out along the stalk 52 of the post 50. When the connector 10 is connected to the stalk 52, the nesting of each latch 18 in a respective slot 52 contributes to the secure mounting of connector 10 to post 50. In this regard, each latch 18 can prevent the connector 10 from sliding up, down or away from the post, with the latch 18 also being unable to rotate in the slot 54.

In the embodiment of FIGS. 1 to 4, a lip in the form of an elongate ridge 20 (see FIG. 1b) is provided at a distal end of each latch 18, adjacent to an end face 19 of the latch 18. The ridge 20 extends along an edge of the latch distal end so as to project inwardly from an inside side face of the latch, thereby pointing back towards the base plate 12 of connector 10. Alternatively or additionally, for even better securement, the ridge may be provided along other edges of the latch distal end (e.g. to surround the latch end).

A bevel 22 can be provided along the ridge 20 to aid in the passage of the latch 18 through a given slot 54. Having so passed, the ridge 20 can then locate behind a surface of the stalk 52 to help lock the connector thereto. The ridge 20 can thereby act as a catch for the latch 18, to further enhance securement of the connector 10 to the post 50. The ridge 20 can be formed from a material with a deformable characteristic, such as a plastic moulding, to allow for its deformation as the latch is being passed through a given slot 54, whereby the ridge deflects back once its latch distal end has passed fully through slot 54.

In a variation of the latch 18 as depicted, the latch 18 may be formed to be dimensionally smaller than the slot 54. This can allow the bevel 22 to pass through the slot without distortion. The bevel 22 can then be retained at the slot by a spring force of the fingers 14 and 16. The bevel 22 again prevents the latch 18 from passing back through the slot when the connector 10 is forced away from the flange 52.

In accordance with the present disclosure, the connector 10 further comprises two locator elements. In the embodiment of FIGS. 1 to 4 the locator elements take the form of opposing and facing locator plates 30 and 32 that are located on the base plate 12 of the connector 10 between the upper and lower fingers 14 and 16. Each plate is reinforced and supported by a series of ribs 33 that extend between the plate and a face of the base plate 12, thus configuring each plate to be relatively rigid.

In a similar manner to fingers 14 and 16, the plates 30, 32 extend out from the face of the base plate 12, and are spaced to define therebetween a recess R which is sized to receive therein (e.g. in a close, snug or tight manner) the stalk 52 of the post 50. In this way, the plates 30 and 32 locate on opposite sides of the stalk 52 when the connector 10 is connected to the stalk 52 (i.e. the inside faces of the plates 30 and 32 can closely face or abut adjacent respective sides of the stalk 52—see FIGS. 3 and 4). Usually the plates 30, 32 do not extend from the base plate 10 to the same extent as do the fingers 14 and 16, as will be explained below.

The plates 30, 32 are configured to guide the mounting of the connector 10 onto the stalk 52 (FIG. 2) and, once located on opposite sides of the stalk 52 (FIG. 3), function to restrict or prevent lateral (i.e. side-to-side) movement of the connector 10 on the post 50. The plates 30, 32 also co-operate with the fingers 14, 16 to enhance securement of the connector 10 to the stalk 52. In this regard, the plates 30, 32 prevent connector side-to-side and rotation movement relatively to the flange, and the fingers 14 and 16 prevent the connector from sliding up, down or away from the flange. This inter-operation between the fingers and plates maintains the latches 18 in their respective slots 54.

The connector 10 of FIGS. 1 to 4 can be moulded such that the fingers 14, 16 are relatively flexible, and the locator plates 30, 32 are relatively rigid. In this case, and as best illustrated by FIG. 2, when mounting the connector 10 to the stalk 52, the fingers 14, 16 are positioned on either side of the stalk, whereby the end faces 19 of the lugs 18 sit adjacent to (i.e. abut) a respective side of the stalk 52. The connector 10 is then rotated (i.e. twisted by a user), so that the fingers 14, 16 bend/flex along their length, to be deformed by the reactionary force exerted by the stalk 52 against the lugs 18, and until the distal edge of the stalk 52 has been aligned with the recess R between the plates 30, 32. The connector 10 is then pushed inwardly of the post, whereby the end faces 19 of the lugs 18 are forced across their respective sides of the stalk 52, and the stalk passes into the recess R between the relatively rigid plates 30, 32. This inwards pushing continues until the lugs 18 align with their respective slots 54 in the stalk 52. The fingers 14, 16 now bend/flex back again, to return to their un-deformed positions, thus forcing the lugs 18 through and into their respective slots 54. The connector 10 is now securely attached to the Y- or T-post as shown in FIG. 3.

In accordance with the present disclosure, typically each of the slots 54 in stalk 52 has a similar profile whereby the connector 10 can be mounted to the Y- or T-post 50 at a number of different locations along the stalk 52.

When the connector 10 is to be used in a wire/strand mounting application, an opposite side of the base plate 12 can be provided with a wire or strand attachment mechanism. In the embodiments shown in FIGS. 1 to 4, the attachment mechanism takes the form of a pin lock 42 having spaced-apart pin supports 43 for mounting an electric or non-electric fence wire, or like item, to the Y- or T-post 50. In this regard, a locking pin 44 can be tethered 46 to a lower end of the base plate 12 and can he inserted through the pin supports 43.

Figure 10:
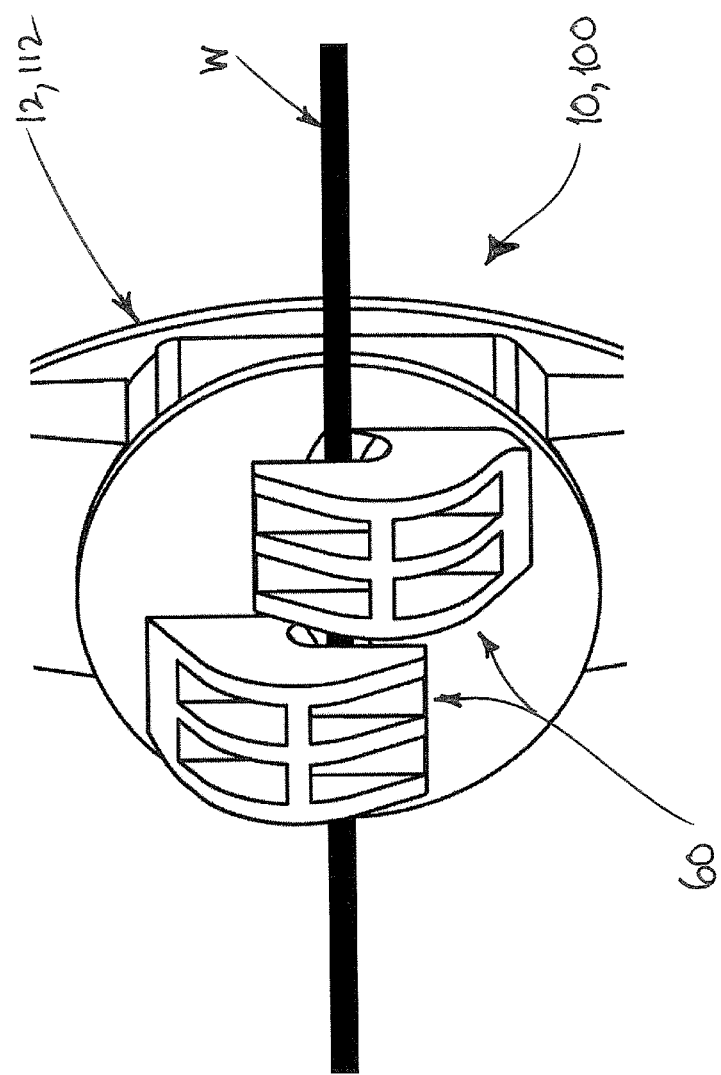
FIG. 10 shows a detail of a modified apparatus to the embodiment of FIGS. 1 to 7 to illustrate a W-connector arrangement.

However, instead of a pin lock arrangement 42,44, as shown in FIG. 10, the attachment mechanism can take the form of a W-connector 60 for mounting an electric or non-electric fence wire W or like item to the Y- or T-post 50.

It should be noted that other forms of attachment mechanism for mounting different articles to the post may be employed.

Figure 5:
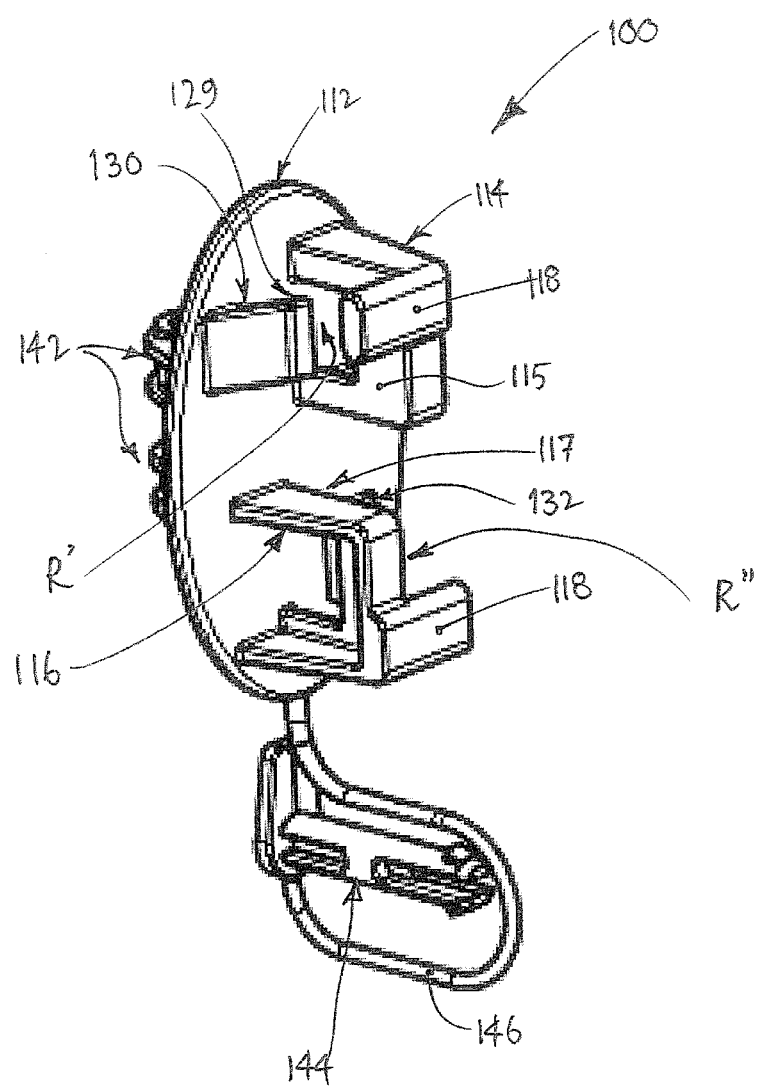
FIG. 5 shows a perspective view of a second embodiment of apparatus for a post mounting system, the apparatus being depicted in an unattached condition.
Figure 6:
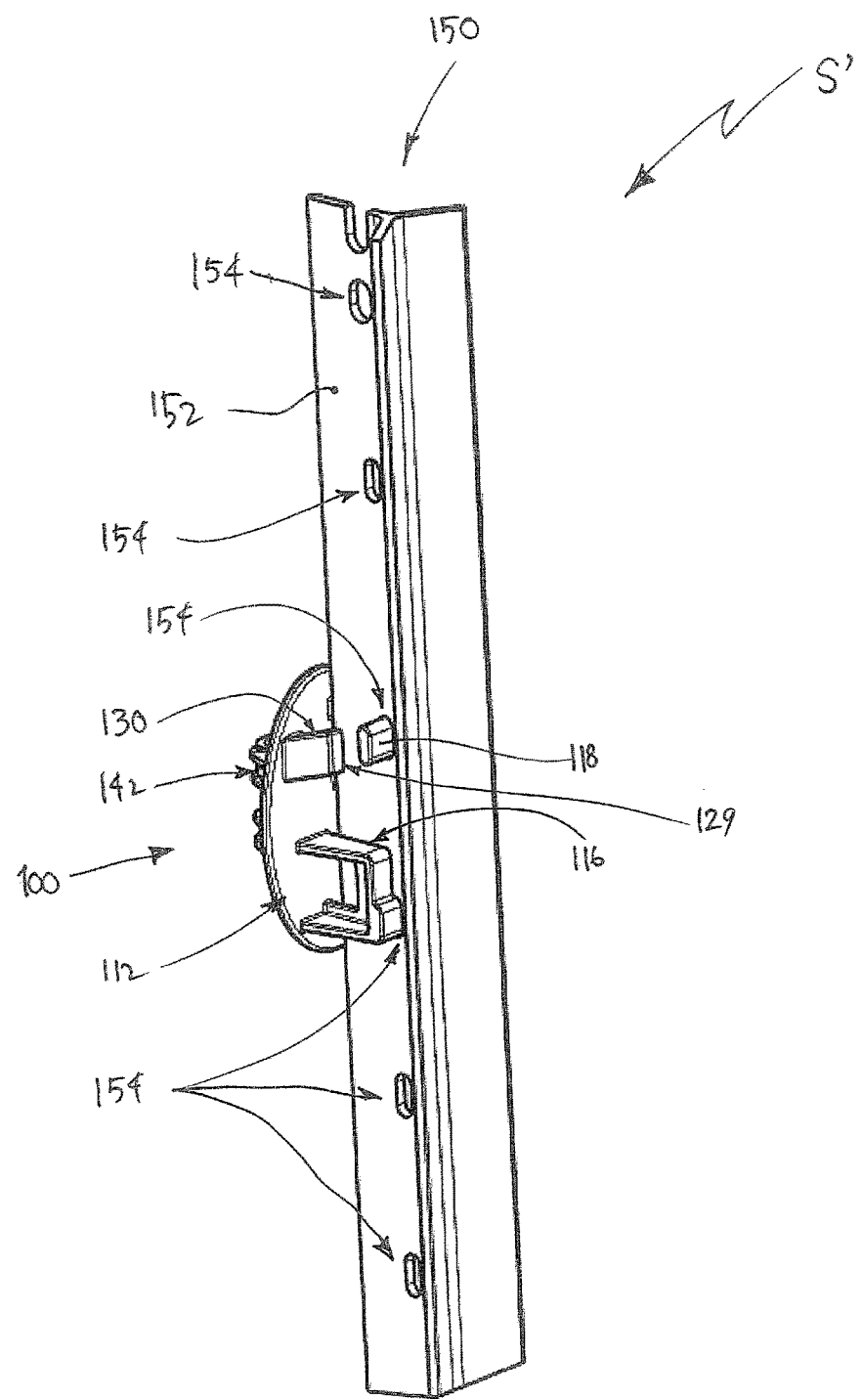
FIGS. 6 and 7 respectively show perspective and end views of the apparatus embodiment of FIG. 5, with the apparatus having been mounted to the stem of the Y- or T-post.
Figure 7:
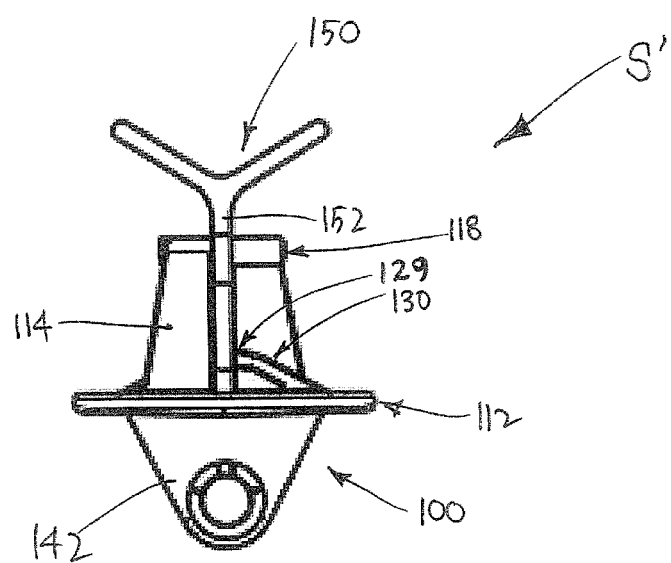

Referring now to FIGS. 5 to 7, a second post mounting system S' comprising a second apparatus embodiment in the form of a connector 100 and an adapted Y- or T-post 150 will now be described. FIGS. 6 and 7 also show the connector 100 of FIG. 5 located on a major flange, the so-called stalk (or stem) 152 of the Y- or T-post 150.

Again, the stalk 152 can have one or more (typically a series of) evenly spaced apertures formed therealong, with the apertures taking the form of slots 154 that can be configured in a similar manner to the slots 54 of the post 50 (i.e. the slots 154 can again be "racecourse" shaped). Again, each of the slots 154 can have a similar profile whereby the connector 100 can be mounted to the post 150 at a number of different locations along the stalk 152.

Again, it should be understood that the connector 100 can be adapted to other post formats. Also, as part of the system. S', a number of such connectors 100 can be attached or mounted along each such Y-post or T-post 150.

The connector 100 again comprises a body in the form of an oval-shaped base plate 112. However, in the connector embodiment of FIGS. 5 to 7, two projections in the form of an upper U-shaped bracket 114 and a lower U-shaped bracket 116 are formed to extend laterally from a face of the base plate 112. The upper U-shaped bracket 114 defines an inside face 115 and the lower U-shaped bracket 116 defines an inside face 117, each of which can sit adjacent to (e.g. to closely face or abut) a respective side of the stalk 152 when the connector 100 is mounted thereto (see FIG. 6).

Usually each bracket 114 and 116 is formed (e.g. configured and moulded of a plastic) to be relatively rigid, and so as to resist deflection by the stalk 152 as the connector 100 push-fitted onto the stalk. In this regard, the brackets can guide the latches 118 into a respective slot 154 when align therewith (i.e. to mount the connector 100 onto the stalk 152—see FIG. 6).

Again, in a simpler form of the connector 100, just a single upper bracket or just a single lower bracket can be provided to extend laterally from the base plate 112. Again, a longer form connector may, for example, be provided that comprises three or more such brackets for e.g. mounting to three adjacent slots.

At a distal edge of each bracket 114 or 116 a laterally protruding lug in the form of a latch 118 is formed. Again, usually the latch is formed (e.g. configured and moulded) to be relatively rigid. In the connector embodiment shown in FIGS. 5 to 7 the latches of the upper bracket 114 and lower bracket 116 again extend in opposite directions, for optimal securement of the connector to the post. However, the brackets 114 and 116 and latches 118 can be rearranged whereby the latches extend in the same direction.

Again, in accordance with the present disclosure, each latch 118 has a cross-sectional profile that is configured to nest (e.g. snugly) in a respective slot 154 formed in the stalk 152. In this regard, each latch 118 can have a racecourse-shaped cross-sectional profile matched to the slot 154. The connector 100 can thus have the same attendant advantages as the connector 10 (i.e. prevention of connector rotation and sliding up. down or away from the post).

The latches 118 are shown to have a greater longitudinal extent than the latches 18 (i.e. so that each latch 118 protrudes right through its respective slot—see FIG. 6). However, each latch 118 may instead be shortened and provided with one or more beveled elongate ridges (e.g. at a distal end thereof), or when of a longer length, at a location inset from the distal end. Such ridge(s) may be similar to the ridge 20 as set forth above for the connector 10, with the same attendant advantages.

In accordance with the present disclosure, the connector 100 again comprises two locator elements. However, in the embodiment of FIGS. 5 to 7 the locator elements take the form of upper and lower spring legs 130, 132 that are configured to extend at an angle away from a face of the base plate 112, and that also generally extend in opposite directions to each other. The upper spring leg 130 opposes and extends towards the upper bracket 114, and the lower spring leg 132 opposes and extends towards the lower bracket 116.

The upper and lower spring legs 130, 132 are formed (e.g. configured and moulded) to he relatively flexible in comparison to the brackets 114, 116, as explained hereafter. In this regard, and as shown, each spring leg is configured and moulded to have the form of a leaf spring.

Further, the upper and lower spring legs 130, 132 are arranged at the base plate 112 to be vertically and horizontally offset from each other, In addition, a distal end edge 129 of each spring leg is rounded along its length to optimise its engagement with a respective side of the stalk 154 when the connector 100 is connected thereto (see FIGS. 6 and 7).

The distal edge 129 of the upper spring leg 130 is spaced from the inside face 115 of the upper bracket 114 to define a first flange recess R' therebetween, and the distal edge 129 of the lower spring leg 132 is spaced from the inside face 117 of the lower bracket 116 to define a second flange recess R" therebetween. Each recess R' and R" is sized to receive therein (e.g. in a close, snug or tight manner) a part of the stalk 152 of the post 150. In this way, the upper and lower spring legs 130, 132 and the inside faces 115, 117 can help to guide the mounting of the connector 100 onto the stalk 152 and, once located on opposite sides of the stalk 152, can function to restrict or prevent lateral (i.e. side-to-side) movement of the connector 100 on the post 150.

It should also be noted that the distal edge 129 of each of the upper and lower spring is legs 130, 132 is arranged to face its respective upper bracket 114 or lower bracket 116 at a location that is inset towards the face of the base plate 112 and with respect to the latches 118 (see especially FIG. 7). This inset configuration means that the distal edges 129 do not align with the adjacent slots 154 when the connector 100 is connected to the stalk 152 (i.e. they instead closely face or abut the stalk).

When the connector 100 of FIGS. 5 to 7 is moulded so that the brackets 114, 116 and latches 118 are relatively rigid and the upper and lower spring legs 130, 132 are relatively flexible, a different mode of mounting of connector 100 in comparison to connector 10 arises. In this regard, when mounting the connector 100 to the stalk 152, the connector 100 is oriented (i.e. pre-twisted by a user before mounting onto the stalk) so that the latches 118 can generally be aligned with a respective slot 154 in the stalk 152 of the post 150. In this initial location the distal edge of the stalk sits adjacent to (behind) each of the upper and lower spring legs 130, 132.

The connector 100 is then rotated (e.g. twisted in an opposite way to the pre-twisting) so that the relatively rigid latches 118 pass into and through the slot 154 in the stalk 152. At the same time, the distal edge of the stalk acts against (i.e. slides across) each of the upper and lower spring legs 130, 132, and causes them to deform (flex back) towards the base plate 112, This inwards flexing continues until the distal edge of the stalk has moved past the distal edge 129 of each of the upper and lower spring legs 130, 132. At this point, each of the upper and lower spring legs 130, 132 flexes (springs) back to return to its original (outwardly biased) position, with the distal edge 129 of each spring legs 130, 132 now abutting against a respective side of the stalk (see FIGS. 6 and 7). This abutment of edges 129 on opposing sides of the stalk 152 prevents the connector 100 from rotating or being displaced in such a direction as to disengage the latches 118 from the slots 154 in the stalk 152 of the post 150, whereby the connector 100 has again become securely mounted to the post 150.

Again, when the connector 100 is to be used in a wire/strand mounting application, an opposite side of the base plate 112 can be provided with a wire or strand attachment mechanism such as pin lock 142 for mounting an electric and non-electric fence wire or like item to the Y- or T-post 150. Again, a locking pin 144 can be tethered 146 to a lower end of the base plate 112.

Alternatively, the W-connector 60 of FIG. 10 can be employed with connector 100, or other forms of attachment mechanism for mounting different articles to the post 150 may he employed.

Figure 8:
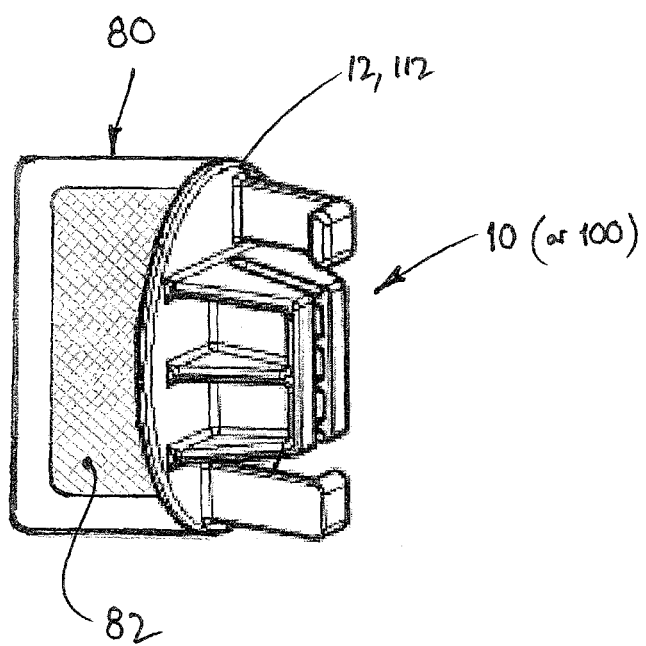
FIG. 8 shows another embodiment of apparatus for a post mounting system, the apparatus being depicted in an unattached condition and comprising a first reflector arrangement.
Figure 9:
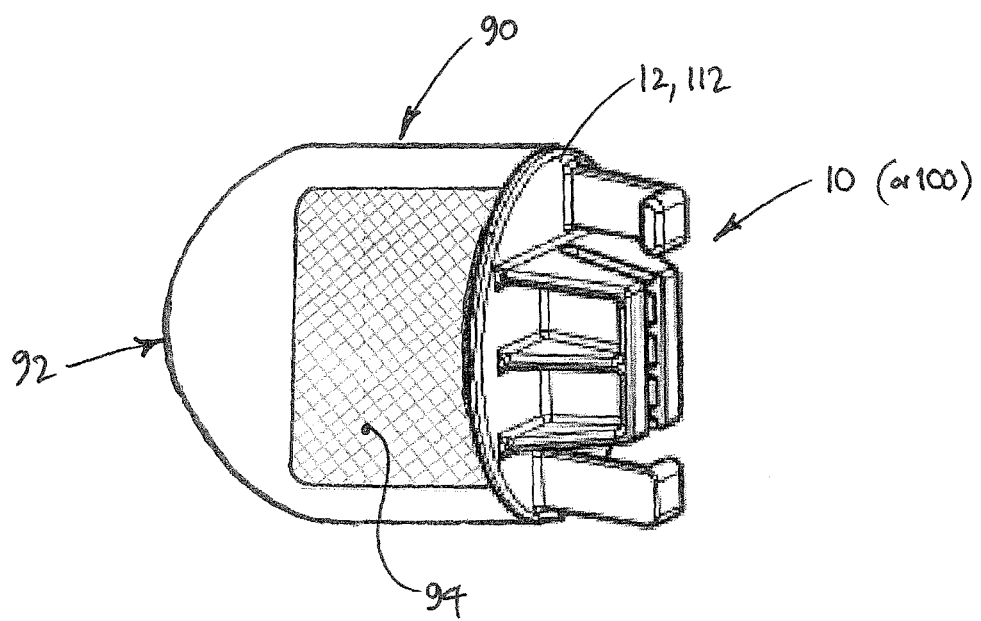
FIG. 9 shows another embodiment of apparatus for a post mounting system, the apparatus being depicted in an unattached condition and comprising a second reflector arrangement.

In further embodiments, and referring now to FIGS. 8 and 9, when the connector 10 or 100 is to be used in signage- or alert-type applications, an opposite side of the base plate 12 or 112 can be modified.

In the embodiment of FIG. 8, the base plate 12 or 112 is modified to have a generally rectangular plate 80 extending therefrom. For example, the plate 80 is integrally formed (e.g. moulded) together with the base plate 12, 112. Whilst the plate 80 may function as a sign, in the embodiment shown the plate 80 takes the form of a reflector having a light reflective surface 82 formed on one or both sides thereof. A series of such reflectors may thus be mounted along a post 50, 150.

In the embodiment of FIG. 9, the base plate 12 or 112 is modified to have a plate 90 with curved outer edge 92. For example, the plate 90 can be integrally formed (e.g. moulded) with the base plate 12, 112. Again, whilst plate 90 may function as a sign, in the embodiment shown the plate 90 takes the form of a reflector having a light reflective surface 94 formed on one or both sides thereof. Again, a series of such reflectors may thus be mounted along a post 50, 150.

In another mode, when the connector 10, 100 is again to be used in signage- or alert-type applications, a reflector (or the like) can be supplied that makes use of the existing attachment mechanism (e.g. pin lock 42, 142 or W-connector 60 of the connector 10, 100), such that the reflector, etc can be indirectly and independently mounted to the Y- or T-post 50, 150.

Figure 11:
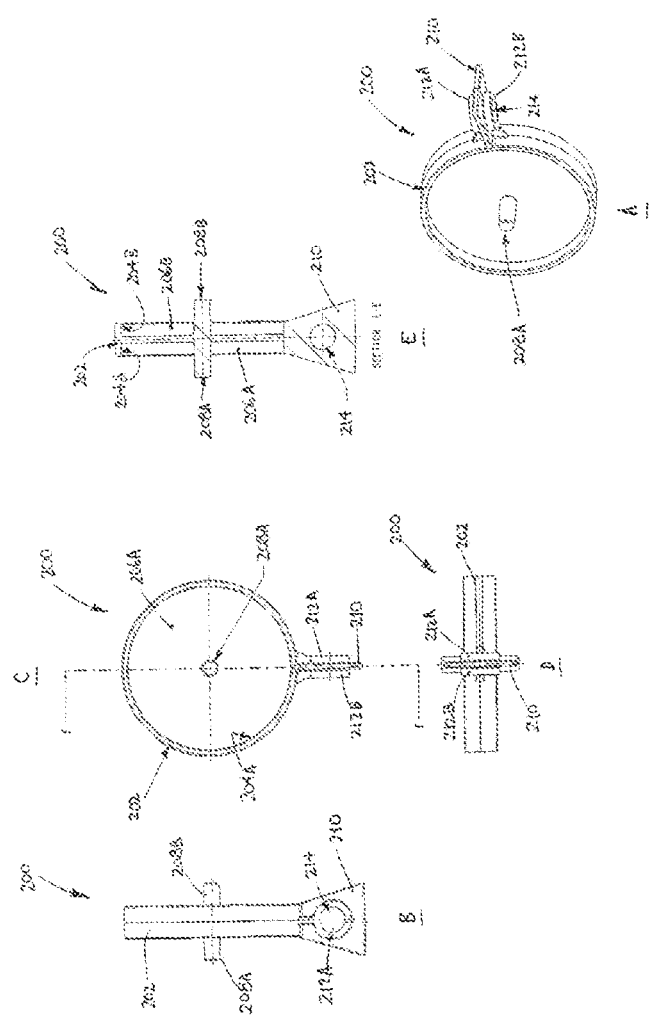
FIGS. 11A to 11E respectively show perspective, plan, front, end and sectional views of an independently locatable reflector embodiment for use with apparatus for a post mounting system.

For example, as shown in FIG. 11, a first independently mountable reflector 200 comprises a circular reflector base 202. Opposing annular-shaped recesses 204A and 204B are defined in opposite sides of the reflector base 202. Respective annularly-shaped reflector elements 206A and 206B are able to be affixed in these recesses (e.g. adhesively; press-, push- or interference-fit; etc). The reflector elements can be formed from a known, highly light reflective material (e.g. a moulded, light-scattering metal-polymer composite, etc). Opposing locating spigots 208A and 208B are centrally formed in each of the recesses 204A and 204B, the spigots protruding beyond central recesses of the annularly-shaped reflector elements 206A and 206B, as best shown in FIGS. 11A, 11B & 11E.

The reflector base 202 has a mounting plate 210 integrally formed to extend laterally therefrom, the plate 210 being rotated by 90° out of the plane of the reflector base 202. Upper and lower pin-supporting hollow bosses 212A and 212B are integrally formed with the plate 210 to respectively project up and down in use of the reflector 200. The bosses 212A and 212B are sized so as to snugly locate for secure mounting in the space between the pin supports 43, 143 of pin lock 42, 142. Thus, when the pin 44, 144 is inserted through the pin supports 43, 143, it is also inserted through aligned holes 214 of the bosses 212A, 212B to thereby lock the reflector 200 to the connector 10, 100.

Figure 12:
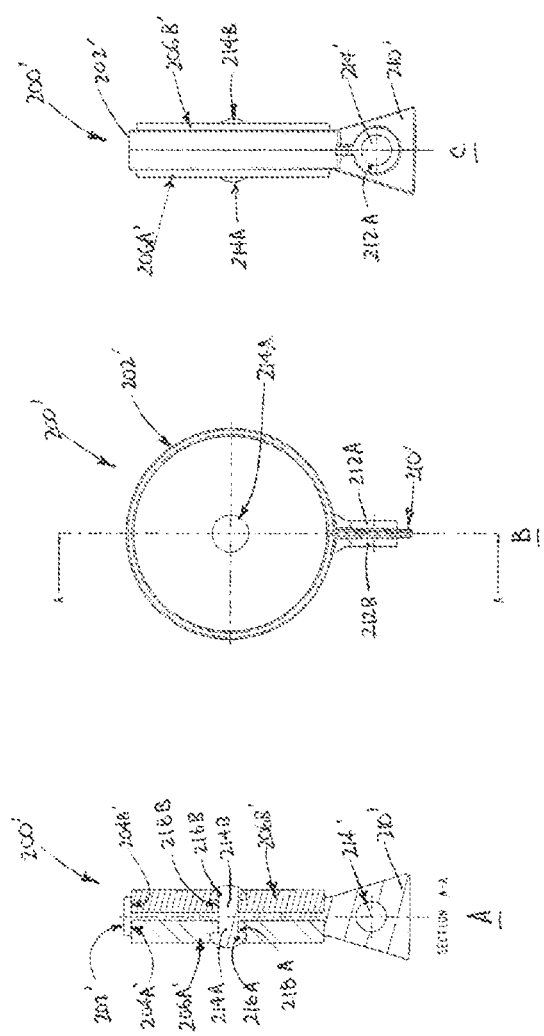
FIGS. 12A to 12C respectively show sectional, front and plan views of another independently locatable reflector embodiment for use with apparatus for a post mounting system.

FIG. 12 shows a second independently mountable reflector 200', with similar or like parts to the reflector 200 being numbered using the same reference numerals, but with a prime' added.

The second reflector 200' differs from the first reflector 200 in that, instead of employing opposing locating spigots 208A and 208B, it comprises opposing locking pegs 214A and 214B that respectively comprise rounded, enlarged heads 216A and 216B. The respective annular reflector elements 206A' and 206B' each comprise a corresponding stepped recess 218A and 218B into which the enlarged heads 216A and 216E are able to respectively locate (see FIG. 12A). In this regard, each reflector element 206A' or 206B' is pushed onto its respective peg 214A or 214B, causing its respective head 216A or 216B to deform, and until that head snap-locks into its corresponding stepped recess 218A or 218B. Other than this, the form and function of reflector 200', including its mounting to connector 10, 100 is essentially the same as for reflector 200.

The reflectors 200, 200' can be moulded from suitable polymers, and can have a shape and configuration quite different to that shown in FIGS. 11 and 12. Also, the plate 210 or 210' can be modified to make it suitable for connection to the W-connector 60 of FIG. 10 (e.g. by having opposing protruding latches that hook behind the W-connector). Again, a series of such reflectors 200, 200' may, together with respective connectors 10, 100, be mounted along a post 50, 150.

The connectors 10, 100 can each be formed by injection moulding of a plastic material. The plastic material can comprise a high density polyethylene or other suitable high-strength plastic.

It should be understood that the connectors 10, 100 can he mounted to other suitably adapted flanges of the Y- or T-post 50, 150. It should also be understood that the latches 18, 118 of the connectors 10, 100 can readily be modified to function with circular, etc holes, rather that with racecourse shaped slots 54, 154.

At least some of the apparatus and system embodiments as set forth herein may provide at least some of the following advantages:

It can be stronger than a prior art single pin attachment.
  The apparatus can take advantage of the cross-section of the aperture in the post being less than the prior art post holes.
  There can be faster installation and easier handling, as there are no loose pins to handle or knock into the apertures of the post or the apparatus itself.
  The apparatus is simply oriented and pushed onto, or pushed and rotated onto, the flange (e.g. stalk) of the Y- or T-post until it is locked in position.
  More stability of the insulator on the post because two mounting positions as well as two locators prevents rotation, sliding, etc.

Whilst a number of specific apparatus and system embodiments have been described, it should be appreciated that the apparatus and system may be embodied in other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and system as disclosed herein.

The invention claimed is:

1. A post mounting system comprising:
   a post having an elongated flange, the flange comprising a first side and a second side opposite the first side, the flange further comprising a plurality of elongated apertures therethrough, the plurality of elongated apertures extending lengthwise with respect to an elongate axis of the post, and the plurality of elongated apertures including a first aperture; and
   an apparatus connected to the flange and secured with respect to the plurality of elongated apertures of the flange, the apparatus being at least partially flexible and comprising:
      a body having a face, the face defining a plane perpendicular to the flange;
      a plurality of projections including a first projection, the first projection extending from the face of the body at the first side of the flange, and the first projection extending to a distal end of the first projection;
      a first lug having an elongate profile, the first lug projecting laterally from the distal end of the first projection, the first lug projecting into the first aperture; and
      a first locator element and a second locator element, the first locator element extending from the face of the body at the first side of the flange, the second locator element extending from the face of the body at the second side of the flange, the first and second locator elements defining therebetween a space receiving the flange in a snug manner, the first locator element extending out to and terminating at a distal end thereof, with the first locator element located entirely at the first side of the flange and not projecting into or through the flange, the second locator element extending out to and terminating at a distal end thereof, with the second locator element located entirely at the second side of the flange and not projecting into or through the flange;
      wherein the first lug nests in the first aperture such that the nesting prevents one or both of rotation of the first lug in the first aperture and sliding of the apparatus up or down the flange; and
      wherein the plurality of elongated apertures include a second aperture, the first and second apertures being spaced out along a length of the flange, and wherein the plurality of projections include a second projection, the second projection extending from the face of the body at a location different from the first projection, the second projection extending to a distal end of the second projection, wherein a second lug projects laterally from the distal end of the second projection and projects into and nests in the second aperture.

2. A post mounting system as claimed in claim 1 wherein a cross-sectional profile of the first lug allows the first lug to nest in a snug manner in the first aperture.

3. A post mounting system as claimed in claim 1 wherein the plurality of projections include only the first and second projections, wherein the second projection extends from the face of the body at the second side of the flange, and
   wherein the first and second lugs extend in opposite directions.

4. A post mounting system as claimed in claim 1 wherein a distal end of the first lug comprises a lip, and wherein the first lug extends through the first aperture whereby the lip is able to locate behind a surface of the flange to further secure the apparatus thereto.

5. A post mounting system as claimed in claim 4 wherein the lip comprises an elongate ridge formed to extend along an edge of the first lug and to project from a side face of the first lug so as to face back towards the body.

6. A post mounting system as claimed in claim 1 wherein the first and second locator elements are arranged to extend out from the body such that the first and second locator elements face each other in an opposed relationship at the first and second sides of the flange such that the first and second locator elements locate at directly opposing regions of the flange.

7. A post mounting system as claimed in claim 1 wherein the first lug has a profile that comprises a round-cornered rectangle to correspond to the first aperture.

8. A post mounting system as claimed in claim 1 wherein the post is a Y-post or a T-post and wherein the flange forms a stalk of the Y-post or a stalk of the T-post.

9. A post mounting system comprising:
   a post having an elongated flange, the flange comprising a first side and a second side opposite the first side, the flange further comprising one or more elongated apertures therethrough, the one or more elongated apertures extending lengthwise with respect to an elongate axis of the post, and the one or more elongated apertures including a first aperture; and
   an apparatus connected to the flange and secured with respect to the one or more elongated apertures of the flange, the apparatus being at least partially flexible and comprising:
      a body having a face, the face defining a plane perpendicular to the flange;
      a plurality of projections including a first projection, the first projection extending from the face of the body at the first side of the flange, and the first projection extending to a distal end of the first projection;
      a first lug having an elongate profile, the first lug projecting laterally from the distal end of the first projection, the first lug projecting into the first aperture; and
      a first locator element and a second locator element, the first locator element extending from the face of the body at the first side of the flange, the second locator element extending from the face of the body at the second side of the flange, the first and second locator elements defining therebetween a space receiving the flange in a snug manner, the first locator element extending out to and terminating at a distal end thereof, with the first locator element located entirely at the first side of the flange and not projecting into or through the flange, the second locator element extending out to and terminating at a distal end thereof, with the second locator element located entirely at the second side of the flange and not projecting into or through the flange;

wherein the first lug nests in the first aperture such that the nesting prevents one or both of rotation of the first lug in the first aperture and sliding of the apparatus up or down the flange;

wherein the first and second locator elements are arranged to extend out from the body such that the first and second locator elements face each other in an opposed relationship at the first and second sides of the flange such that the first and second locator elements locate at directly opposing regions of the flange; and wherein the plurality of projections further include a second projection and the plurality of projections include only the first and second projections, and wherein the first and second projections and the first and second locator elements all project from the face of the body such that the first projection is longitudinally offset from each of the first and second locator elements so as to be located above the first and second locator elements and the second projection is longitudinally offset from each of the first and second locator elements so as to be located below the first and second locator elements.

10. A post mounting system comprising:

a post having an elongated flange, the flange comprising a first side and a second side opposite the first side, the flange further comprising a plurality of elongated apertures therethrough, the plurality of elongated apertures extending lengthwise with respect to an elongate axis of the post, and the plurality of elongated apertures including a first aperture; and an apparatus connected to the flange and secured with respect to the plurality of elongated apertures of the flange, the apparatus being at least partially flexible and comprising:

a body having a face, the face defining a plane perpendicular to the flange;

a plurality of projections including a first projection, the first projection extending from the face of the body at the first side of the flange, and the first projection extending to a distal end of the first projection;

a first lug having an elongate profile, the first lug projecting laterally from the distal end of the first projection, the first lug projecting into the first aperture; and a first locator element and a second locator element, the first locator element extending from the face of the body at the first side of the flange, the second locator element extending from the face of the body at the second side of the flange, the first and second locator elements defining therebetween a space receiving the flange in a snug manner, the first locator element extending out to and terminating at a distal end thereof, with the first locator element located entirely at the first side of the flange and not projecting into or through the flange, the second locator element extending out to and terminating at a distal end thereof, with the second locator element located entirely at the second side of the flange and not projecting into or through the flange;

wherein the first lug nests in the first aperture such that the nesting prevents one or both of rotation of the first lug in the first aperture and sliding of the apparatus up or down the flange;

wherein the plurality of projections include a second projection and include only the first and second projections, the second projection extending from the face of the body at the second side of the flange, the second projection extending to a distal end of the second projection, wherein the plurality of elongated apertures include a second aperture, the first and second apertures being spaced out along a length of the flange, and wherein a second lug projects laterally from the distal end of the second projection and projects into and nests in the second aperture, the first and second projections being relatively flexible with respect to the first and second locator elements, the first and second locator elements being relatively rigid with respect to the first and second projections, the apparatus being configured such that, during connection of the apparatus to the flange:

the first and second projections are able to flex to be positioned so that the first projection can sit adjacent to the first side of the flange and the second projection can sit adjacent to the second side of the flange, when the apparatus is rotated, the first and second projections can be caused to flex until a distal edge of the flange aligns with the space defined between the first and second locator elements, and when the apparatus is then pushed inwardly of the post, the first and second lugs can be urged across the flange whilst, at the same time, the flange can pass into the space between the first and second locator elements, until the first and second lugs are respectively aligned with the first and second apertures in the flange, at which time the first and second projections can flex back to cause the first and second lugs to pass into the first and second apertures, respectively, to mount the apparatus to the post.

11. A post mounting system comprising:

a post having an elongated flange, the flange comprising a first side and a second side opposite the first side, the flange further a plurality of elongated apertures therethrough, the plurality of elongated apertures extending lengthwise with respect to an elongate axis of the post, and the plurality of elongated apertures including a first aperture; and an apparatus connected to the flange of the post, the apparatus being at least partially flexible and comprising:

a body having a face defining a plane perpendicular to the flange, a plurality of projections including a first projection that extends from the face of the body at the first side of the flange, the first projection extending to a distal end of the first projection, a first lug that projects laterally from the distal end of the first projection, the first lug projecting into the first aperture, and one or more locator elements including a first locator element extending from the face of the body at one of the first and second sides of the flange, the first locator element extending out to and terminating at a distal end thereof, with the first locator element located entirely at the one of the first and second sides of the flange and not projecting into or through the flange, such that the first lug nests in the first aperture in a manner such that the nesting prevents one or both of rotation of the first lug in the first aperture and sliding of the apparatus up or down the flange; and wherein the plurality of elongated apertures include a second aperture, wherein the plurality of projections include a second projection, wherein the plurality of projections include only the first and second projections, wherein the second projection extends from the body to a distal end of the second projection, and wherein a second lug projects laterally from the distal end of the second projection and projects into the second aperture, such that the second lug nests in the second aperture.

12. A post mounting system as claimed in claim 11, wherein the first and second lugs project in opposite directions to each other.

13. A post mounting system as claimed in claim 11, wherein the one or more locator elements include a second locator element, the first and second locator elements extending in generally a same direction from the body as the first projection, such that the first and second locator elements define therebetween a space receiving the flange.

* * * * *